US012764011B2

(12) United States Patent
Suh et al.

(10) Patent No.: US 12,764,011 B2
(45) Date of Patent: Oct. 13, 2026

(54) SYSTEMS AND METHODS RELATED TO INDEX MODULATION FOR WIRELESS LOCAL AREA NETWORK

(71) Applicant: HUAWEI TECHNOLOGIES CO., LTD., Shenzhen (CN)

(72) Inventors: Jung Hoon Suh, Kanata (CA); Sara Norouzi, Kanata (CA); Yan Xin, Kanata (CA); Mahmoud Ahmed Mohammed Hasabelnaby, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/808,464

(22) Filed: Aug. 19, 2024

(65) Prior Publication Data

US 2026/0052055 A1 Feb. 19, 2026

(51) Int. Cl.
*H04L 27/36* (2006.01)
*H04L 1/00* (2006.01)

(52) U.S. Cl.
CPC ............ *H04L 27/36* (2013.01); *H04L 1/0041* (2013.01)

(58) Field of Classification Search
CPC .............................. H04L 27/36; H04L 1/0041
See application file for complete search history.

(56) References Cited

U.S. PATENT DOCUMENTS

| | | | | |
|---|---|---|---|---|
| 9,281,924 | B2 * | 3/2016 | Abraham | H04L 5/0044 |
| 11,811,526 | B2 * | 11/2023 | Hu | H04L 27/2626 |
| 12,355,570 | B2 * | 7/2025 | Wu | H04L 1/0025 |
| 2015/0349995 | A1 * | 12/2015 | Zhang | H04L 27/26025 375/295 |
| 2019/0141717 | A1 * | 5/2019 | Yang | H03M 13/1102 |
| 2022/0416988 | A1 * | 12/2022 | Cao | H04B 1/69 |
| 2025/0266942 | A1 * | 8/2025 | Handte | H04L 5/0044 |

FOREIGN PATENT DOCUMENTS

WO 2022109027 A1 5/2022

OTHER PUBLICATIONS

J. Suh, et al., "Update of the Spatial Modulation", IEEE 802.11-23/1927r1. Nov. 2023.

(Continued)

*Primary Examiner* — Freshteh N Aghdam

(57) ABSTRACT

Methods, systems and apparatus related to index modulation for WLAN (IEEE 802.11) are provided. An information-carrying bit sequence to be transmitted is separated into two parts. The first part is used as the basis for selecting tones from distributed resource units (DRUs) which are defined for use in transmission of a frame. The second part is used as the basis for generating modulation symbols for transmission. The modulation symbols are then transmitted using the selected tones. At the receiver, the tones which are used are determined by an energy detection method, and the modulation symbols are also decoded. A recovered bit sequence is generated based on the determined tones and the modulation symbols. Where there are N DRUs, each having T tones, T groups of tones can be defined. From each group of tones, one tone is selected based on a sub-part of the bit sequence's first part.

19 Claims, 10 Drawing Sheets

(56) References Cited

OTHER PUBLICATIONS

J. Suh, et al., "Improvement of the SU-MIMO Part 1: Spatial Modulation", IEEE 802.11-23/1328r0, Jul. 2023.
E. Basar, et al., "Index Modulation Techniques for Next-Generation Wireless Networks", IEEE Access (vol. 5), pp. 16693-16746, Aug. 2017.
S. Hu et al., "DRU Tome Plan for 11 bn", IEEE 802.11-24/468r2, Mar. 2024.

* cited by examiner

SYSTEMS AND METHODS RELATED TO INDEX MODULATION FOR WIRELESS LOCAL AREA NETWORK

CROSS-REFERENCE TO RELATED APPLICATIONS

This is the first application made for the instantly disclosed technology.

FIELD OF THE INVENTION

The present invention pertains to wireless communication or networking, and in particular to methods, systems and apparatus related to index modulation for wireless local area network (WLAN).

BACKGROUND

Wi-Fi™ 8 (IEEE 802.11bn, ultra-high reliability (UHR)) communication systems are being developed to improve wireless communication performance over previous Wi-Fi™ systems. One potential feature of such systems is the use of distributed resource units (DRUs) which includes a set of tones that may be allocated across a bandwidth that is greater than a bandwidth of the aggregate set of tones. The tones of different DRUs may be fully or partially interleaved with one another to form multiple non-contiguous sets of tones.

Index modulation (IM) is a type of modulation technique that uses the activation states of resources for information embedding. Through IM, part of the information to be communicated is implicitly embedded into the transmitted signal. Several different types of resources have been considered for use in index modulation, such as antennas, subcarriers, time slots, frequencies, etc.

However, the application of IM in standardized systems such as Wi-Fi™ 8, or systems utilizing DRU tone plans, particularly with the IM applying to the DRU tone plans as the index-modulated resource, has not heretofore been conceived of, sufficiently developed, or else is subject to improvement.

Therefore, there is a need for methods, systems and apparatus for index modulation for WLANs, such as in Wi-Fi™ systems, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The disclosure may provide for methods, systems and apparatus related to index modulation, for example for WLAN systems such as (but not necessarily limited to) IEEE 802.11 systems and more particularly for IEEE 802.11bn and beyond.

According to an aspect, there is provided a method performed by a device (e.g. chip) of an IEEE 802.11 transmitter. The method includes parsing a bit sequence containing bits for transmission into a first sequence and a second sequence. The method includes selecting a plurality of tones belonging to a plurality of IEEE 802.11 distributed resource units (DRUs), the selecting being based on the first sequence (e.g. a portion thereof). The method includes generating and transmitting an IEEE 802.11 frame comprising a group of modulation symbols each of which is generated based on a portion of the second sequence, the group of modulation symbols being transmitted using the selected plurality of tones.

The above-described method can be repeated for multiple portions of the first sequence and multiple portions of the second sequence. That is, multiple sets (pluralities) of tones can be generated, each representing a different respective portion of the first sequence. Similarly, multiple modulation symbols can be generated based on and representing a different respective portion of the second sequence. Then, each of the multiple modulation symbols can be transmitted using a respective one of the multiple sets of tones.

According to embodiments, there are N DRUs, and each of the plurality of DRUs comprises a number T of tones, the N DRUs thus having a total number N*T of tones, the total number N*T of tones partitioned into a plurality of T groups of tones, the method further comprising: for each group of the plurality of groups of tones, selecting a tone from the group based on a respective sub-part of the first sequence. The sub-part may include $\log_2(N)$ bits, or an equivalent amount of information. Each tone may be used to carry a corresponding one of the at least one modulation symbols. According to further embodiments, each group of the plurality of T groups of tones has N tones including one tone from each of the N DRUs. According to embodiments, N equals 4, T equals 52, and each of the DRUs is spread across a 20 MHz bandwidth.

In some embodiments, the method further includes, at a time of transmitting the group of modulation symbols using the selected plurality of tones: refraining from transmitting on all tones belonging to the plurality of IEEE 802.11 distributed resource units (DRUs) that are other than the selected plurality of tones.

In some embodiments, the first sequence, used for tone selection, is non-channel-encoded.

In some embodiments, each member of the group of modulation symbols is a Quadrature-Amplitude Modulation (QAM) symbol mapped to (e.g. transmitted using) one of the selected plurality of tones. The group of modulation symbols may together represent an OFDM symbol.

According to an aspect, there is provided a method performed by a device (e.g. chip) of an IEEE 802.11 receiver. The method includes receiving, using one or more antennas of the device, radiofrequency energy indicative of an IEEE 802.11 frame. The method includes determining a set of tones, belonging to a plurality of IEEE 802.11 distributed resource units (DRUs), that carry a group of modulation symbols of the IEEE 802.11 frame. The method includes generating a first recovered bit sequence having a portion that is based on the determined set of tones. The method includes generating a second recovered bit sequence having a portion that is based on the group of modulation symbols carried by the determined set of tones. The method includes combining the first recovered sequence and the second recovered sequence to generate an overall recovered bit sequence indicative of information carried by the IEEE 802.11 frame.

In some embodiments, there are N DRUs, and each of the plurality of DRUs comprises a number T of tones, the N DRUs thus having a total number N*T of tones, the total number N*T of tones partitioned into a plurality of T groups of tones. In such embodiments, the method may further include, for each group of the plurality of groups of tones, determining a corresponding one of the set of tones from the group, said corresponding one of the set of tones carrying a highest amount of energy among all of the tones of the group.

In some embodiments, determining the corresponding one of the set of tones carrying the highest amount of energy comprises comparing energy levels between all of the tones of the group.

In some embodiments, determining the corresponding one of the set of tones carrying the highest amount of energy comprises comparing energy levels between pairs of the tones of the group.

In some embodiments, each group of the plurality of T groups of tones has N tones including one tone from each of the N DRUs. In some embodiments, N equals 4, T equals 52, and each of the DRUs is spread across a 20 MHz bandwidth.

In some embodiments, the portion of the first recovered bit sequence includes $T*\log_2(N)$ bits.

In some embodiments, each member of the group of modulation symbols is a Quadrature-Amplitude Modulation (QAM) symbol mapped to one of the selected plurality of tones.

According to another aspect, an apparatus may be provided. The apparatus includes modules or electronics configured to perform one or more of the methods and/or implement one or more of the systems described herein.

For example, embodiments provide for an apparatus (e.g. a chip) in a device of an IEEE 802.11 transmitter. The apparatus is configured to parse a bit sequence containing bits for transmission into a first sequence and a second sequence. The apparatus is configured to select a plurality of tones belonging to a plurality of IEEE 802.11 distributed resource units (DRUs), the selecting being based on the first sequence. The apparatus is configured to generate and transmit an IEEE 802.11 frame comprising a group of modulation symbols each of which is generated based on a portion of the second sequence. The group of modulation symbols are transmitted using the selected plurality of tones.

As another example, embodiments provide for an apparatus (e.g. a chip) in a device of an IEEE 802.11 receiver. The apparatus is configured to receive, using one or more antennas of the device, radiofrequency energy indicative of an IEEE 802.11 frame. The apparatus is configured to determine a set of tones, belonging to a plurality of IEEE 802.11 distributed resource units (DRUs), that carry a group of modulation symbols of the IEEE 802.11 frame. The apparatus is configured to generate a first recovered bit sequence having a portion that is based on the determined set of tones. The apparatus is configured to generate a second recovered bit sequence having a portion that is based on the group of modulation symbols carried by the determined set of tones. The apparatus is configured to combine the first recovered bit sequence and the second recovered bit sequence to generate an overall recovered bit sequence indicative of information carried by the IEEE 802.11 frame.

Other aspects of the above-described transmitter and receiver apparatus can also be provided, for example commensurate with the method aspects as already described above.

According to one aspect, an apparatus may be provided, where the apparatus includes: a memory, configured to store a program; a processor, configured to execute the program stored in the memory, and when the program stored in the memory is executed, the processor is configured to perform one or more of the methods and systems described herein.

According to another aspect, a computer readable medium may be provided, where the computer readable medium stores program code executed by a device and the program code is used to perform one or more of the methods and systems described herein.

According to one aspect, a chip may be provided, where the chip includes a processor and a data interface, and the processor reads, by using the data interface, an instruction stored in a memory, to perform one or more of the methods and systems described herein. Aspects may further include the memory. Additionally or alternatively, the chip may include electronics hardware such as digital circuits, analog circuits, or a combination thereof, which are configured to implement the operations as described herein, including processing of information to generate and transmit wireless signals, to receive and decode wireless signals, or both.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods and systems described herein. A system as provided herein may include at least one transmitter apparatus and at least one receiver apparatus, the transmitter apparatus communicating to the receiver apparatus. A corresponding method involving operations of both transmitter and receiver, in communication, may also be provided.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present disclosure provide for apparatus, methods and systems related to index modulation for WLAN in general and in particular for IEEE 802.11 (Wi-Fi™) wireless networks. Embodiments pertain in particular to implementations that utilize distributed resource units (DRUs) for communication, and perform an index modulation via selecting tones of the DRUs for use in transmitting modulation symbols.

The introduction of the DRU in IEEE 802.11 ultra high reliability (UHR) systems (e.g. IEEE 802.11bn, Wi-Fi 8) marks a notable advancement. The power spectral density (PSD) requirement set by the Federal Communications Commission (FCC) regulation imposes an upper bound on transmit (TX) power at every 1 Megahertz (MHz). Embodiments of the present disclosure pertain to such IEEE 802.11 systems, for example as specified by the appropriate working group(s).

Within the DRU framework, subcarriers in each Resource unit (RU) can span or be allocated across the entire Bandwidth (BW) of the frame, allowing each RU to use the full frame bandwidth regardless of RU size, known as a DRU. In contrast, a Regular RU (RRU) only occupies a sub-bandwidth according to its RU size. This application of FCC's PSD regulation is based on the frame's BW where DRU-based orthogonal frequency division multiple access (OFDMA) is scheduled, particularly benefiting uplink (UL) OFDMA PHY protocol data unit (PPDU) transmissions.

Therefore, and according to embodiments, an orthogonal frequency division multiple access (OFDMA) or similar frame is communicated, utilizing a plurality of distributed resource units (DRUs). Each DRU of the plurality of DRUs includes a respective group of subcarriers spread across a predetermined bandwidth of the OFDMA frame. The plurality of DRUs may be partially or fully interleaved with one another in frequency.

Figure 1:
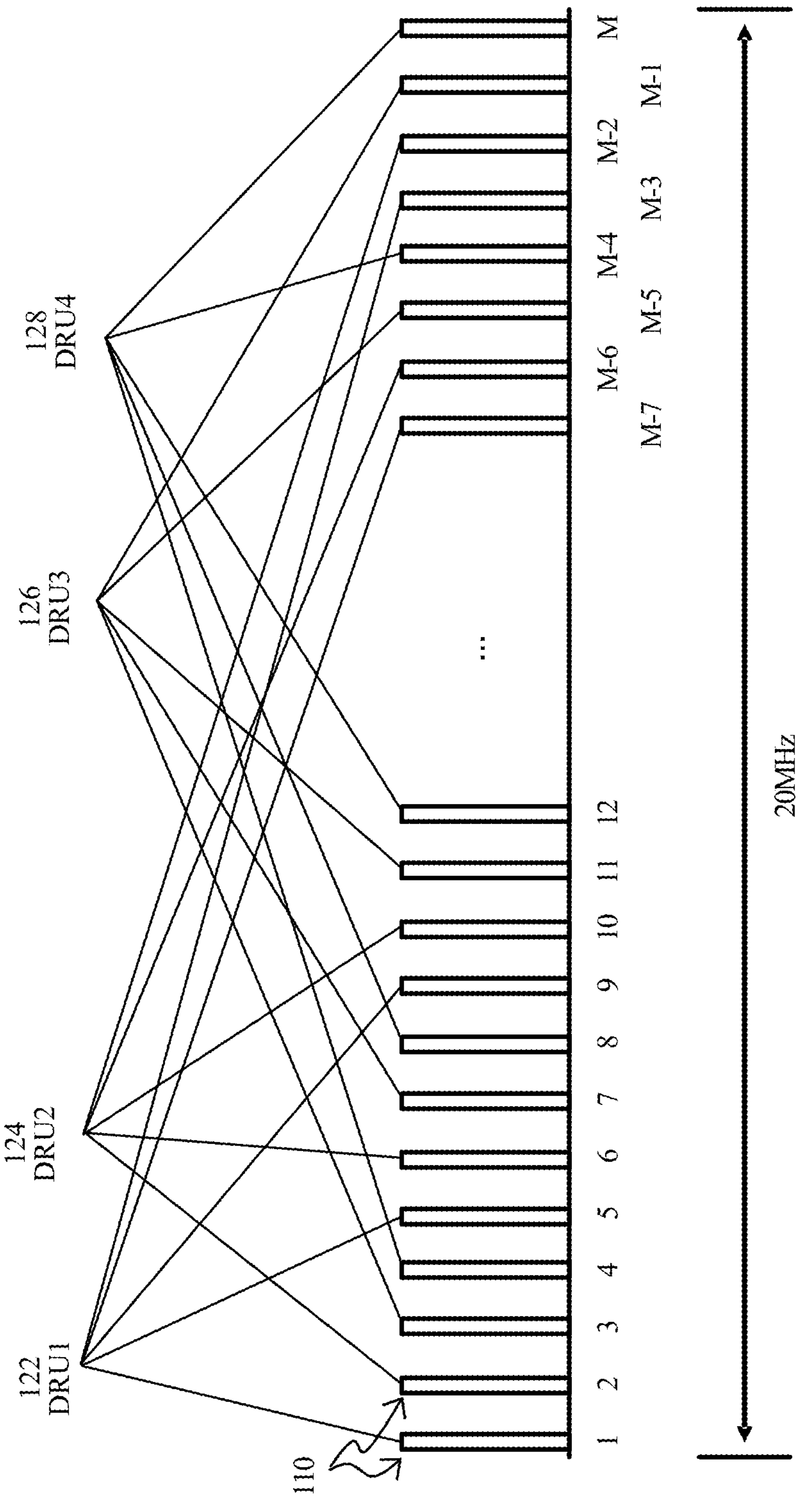
FIG. 1 illustrates an example distributed resource unit (DRU) tone plan for an IEEE 802.11 communication scenario, according to an embodiment of the present disclosure.

FIG. 1 illustrates an example of a DRU tone plan showing N=4 interleaved 52-tone DRUs in a 20 MHz frame, according to an example implementation scenario for the present disclosure. Each DRU is spread across the 20 MHz bandwidth of the frame by suitable spacing of constituent tones, and the DRUs are interleaved with one another. The tones 110 may represent subcarriers which are arranged from left to right in order of increasing frequency, each tone being spaced apart by a suitable interval. The subcarriers may be orthogonal in the sense of OFDM or OFDMA. There are a total of M tones, where M≥208 in the present example, giving capacity for four sets of 52 tones each. For purposes of illustration, M is assumed to equal 208. It should be noted that the values of M and N=4 are used as an example, and M and N can take on different values in other embodiments. If M is not an integer multiple of N, there may be leftover tones or an unequal allocation of tones to DRUs. For example, if M=220, there may be 12 leftover tones which are not necessarily allocated to any of the DRUs. For clarity, there are assumed to be T (e.g. T=52) tones per DRU. If DRUs were to have different numbers of tones, then T can be taken for example as the number of tones in the DRU with the least amount of tones.

The tones are allocated to the N=4 DRUs in a regularly interleaved pattern, so that the first (leftmost) tone is allocated to the first DRU (DRU1) 122, the second tone from the left is allocated to the second DRU (DRU2) 124, the third tone from the left is allocated to the third DRU (DRU3) 126, and the fourth tone from the left is allocated to the fourth DRU (DRU4) 128. This pattern repeats, e.g. with the fifth tone from the left allocated to DRU1, the sixth tone from the left allocated to DRU2, etc. More generally, for t=1, 2, 3, . . . and n=1, 2, 3, 4, the tone at index position 4(t−1)+n from the left is allocated to the $n^{th}$ DRU. The value t can be regarded for purposes of illustration as the $t^{th}$ tone of the corresponding DRU.

Therefore, multiple (N) DRUs are defined, each of which includes T (partially or fully) noncontiguous subcarrier indices, or tones, where the T subcarrier indices of each DRU spans an entire bandwidth, e.g. of a wireless channel. The N DRUs thus collectively have a total number of N*T tones. It is noted that T may equal or approximately equal M/N (e.g. M/4). In the above example, the tones of each DRU are regularly spaced and the interleaving is also regular. However, in practice, this is not necessarily the case, and different patterns of tones and interleavings can be applied, such that at least some tones of a given DRU are non-contiguous, i.e. interspersed with at least one tone of another DRU.

Conventionally, a single DRU can be used for a given transmission as follows. One of the four DRUs is selected, and then the tone of only that DRU are modulated to transmit. The modulation is performed according to OFDM symbols which can carry information such as payload data. An inverse fast Fourier transform (IFFT) operation is applied to the tones as modulated according to the OFDM symbols.

For clarity, and as used herein, an OFDM symbol refers to a symbol that is communicated using multiple orthogonal subcarriers (tones). Each tone is modulated so that it communicates a respective modulation symbol. This modulation symbol of a tone can be a quadrature amplitude modulation (QAM) symbol, although other types of symbols such as binary phase shift keying (BPSK), quadrature phase shift keying (QPSK) etc. may also be used. The OFDM symbol includes or is composed of the multiple modulation symbols of the multiple tones. In other words, a group of (e.g. T) modulation symbols can together represent an OFDM symbol.

Figure 2:
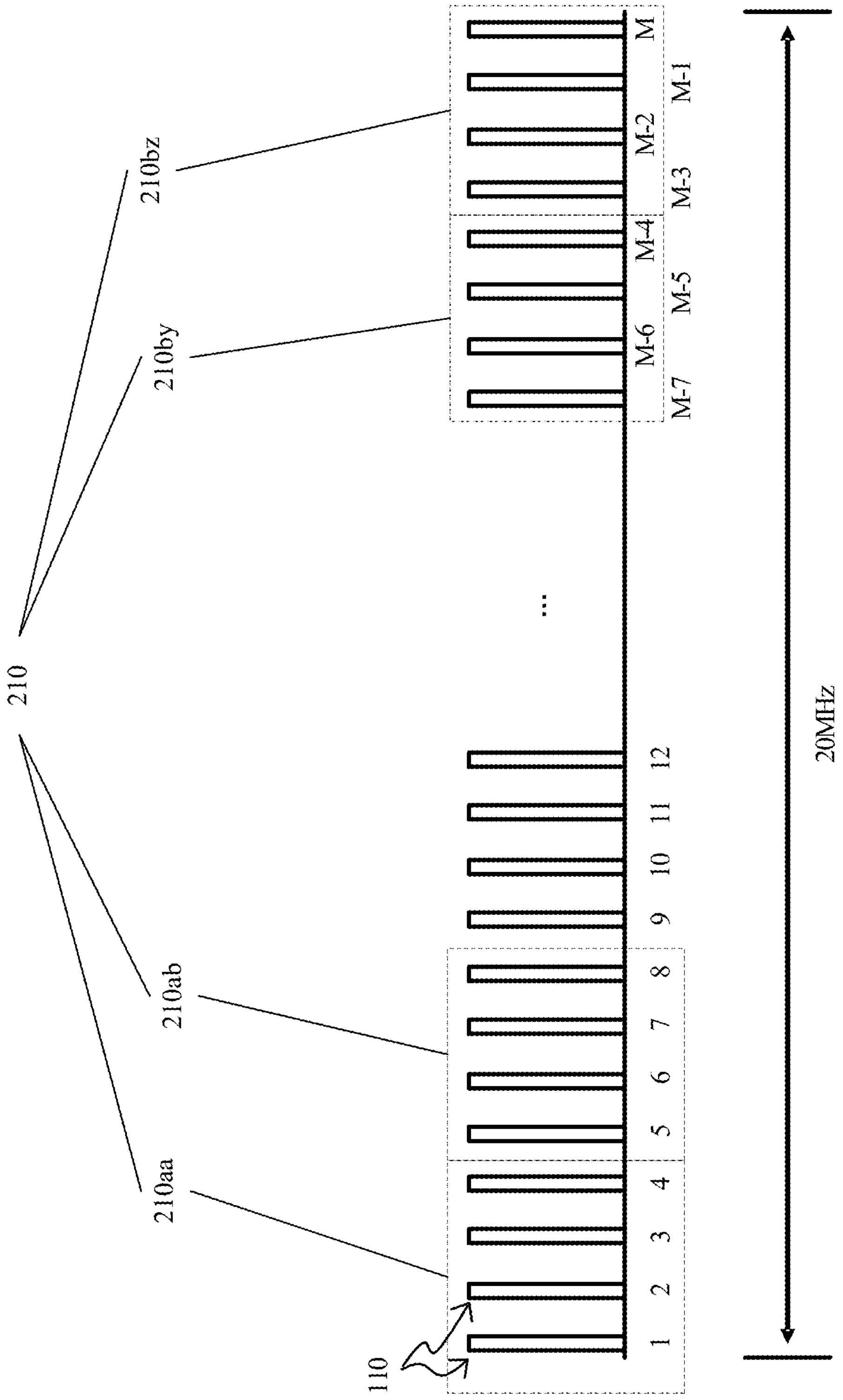
FIG. 2 illustrates an example grouping of the DRUs of FIG. 1, into multiple groups, each including one tone from each DRU, according to an embodiment of the present disclosure.

In contrast, according to embodiments of the present disclosure, multiple DRUs are used for a same given transmission. In the following example, all N=4 DRUs 122, 124, 126, 128 are used for a transmission, although in other embodiments less than all of the available DRUs can be used. Referring to FIG. 2, T=52 groups 210 of tones are defined, i.e. the same number of groups as there are DRU tones. As shown, each group includes a single tone from each of the N available DRUs. By way of example, four such groups 210*aa*, 210*ab*, 210*by* and 210*bz* are shown. Accordingly, there are N DRUs, each including a number T of tones for a total number of N*T tones. This total number N*T of tones can be partitioned into T groups of tones (e.g. with no single tone belonging to more than one group of tones). As shown, each group of the T groups of tones can include N tones, including one tone from each of the N DRUs.

According to embodiments, for each group 210 (or for at least some of the groups), information-carrying bits, also referred to as tone selection bits, are used to select one of the tones from that group, to be used for transmission. This selection represents part of an index modulation operation. That is, the selected tone conveys information, in addition to the information of modulation symbols which are carried on the selected tones. (The actual identity of the selected tone, out of multiple potential tones, conveys information.) The tone selection bits can be obtained from a scrambled bit sequence, which is parsed into two parts, namely a first sequence and a second sequence. The first sequence provides the tone selection bits which are used for tone selection as above. The second sequence is used to generate constellation-mapped modulation symbols, which are used as the basis for modulating the selected tones. A sequence can also be referred to as a stream or flow.

Accordingly, once all tones are selected according to the above process, the selected set of tones are used in PPDU transmission, after applying (constellation-mapped) modulation symbols to the selected tones.

Figure 3:
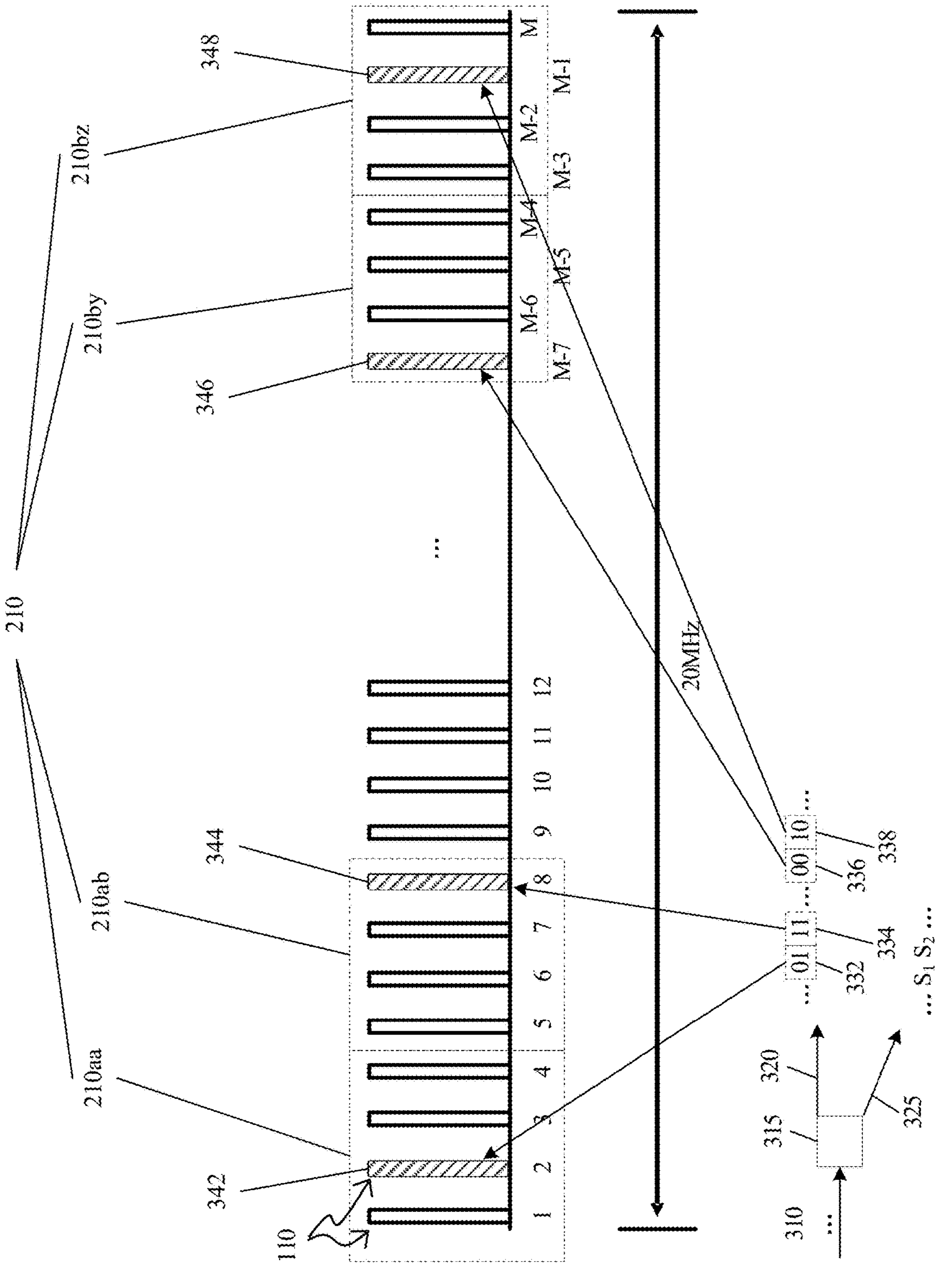
FIG. 3 illustrates the usage of the grouping of the DRUs of FIG. 2 to implement an index modulation (IM), according to an embodiment of the present disclosure.

By way of example, FIG. 3 shows an instance of FIG. 2 in which a bit sequence 310 is parsed 315 into a first sequence of tone selection bits 320 and a second sequence 325 which is used for generating modulation symbols. The tone selection bits 320 includes bits '01', '11', '00', and '10' which are to be applied for tone selection in the first, second, second-last and last groups of DRUs 210, namely groups 210*aa*, 210*ab*, 210*by* and 210*bz*, respectively. An example mapping rule is implemented by which tone selection bits of values '00', '01', '10', and '11' result in selection of the first, second, third or fourth tone of a group, respectively. Accordingly, and as illustrated, the tone selection bits '01' 332 applied to group 210*aa* results in the second tone 342 of that group being selected for use, the tone selection bits '11' 334 applied to group 210*ab* results in the fourth tone 344 of that group being selected for use, the tone selection bits '00' 336 applied to group 210*by* results in the first tone 346 of that group being selected for use, and the tone selection bits '10' 338 applied to group 210*bz* results in the third tone 348 of that group being selected for use. Accordingly, a plurality of tones, belonging to a plurality of DRUs, are selected based on the first sequence. When the first sequence is ongoing, the plurality of tones can be selected based on a portion of the first sequence, and, later, another plurality of tones can be selected based on another portion of the first sequence. The first sequence can subdivided into sub-parts, each of which is used as the basis for selecting a tone from a group of tones. In the example above, with N=4, each sub-part includes two bits. More generally, the sub-part can include $\log_2(N)$ bits, so that a sub-part can express every possible selection of a single tone from a group of N tones, and can be used as the basis for selecting any one of these N tones.

The second sequence of bits 325 is used to generate a sequence (group) of modulation symbols $S_1$, $S_2$, . . . to be transmitted using the selected plurality of tones. Accordingly, a group of T modulation symbols is generated, with each modulation symbol based on a portion of the second sequence. In transmitting a group of modulation symbols using a selected plurality of tones, each one of the modulation symbols is mapped to a corresponding one of the tones. Then the tone is modulated based on contents of the modulation symbol (e.g. according to a QAM modulation). The modulated tones are then transmitted as part(s) of an IEEE 802.11 frame.

In the illustrated embodiment, where each modulation symbol is carried via one of T (e.g. 52) tones, and each tone is selected from a group of N (e.g. 4) candidate tones of respective subcarriers, a number $T*\log_2(N)$ of tone selection bits are required and conveyed per group of T modulation symbols. The group of T modulation symbols in turn can correspond to a single OFDM symbol. That is, in the present example, two bits are required and conveyed for selecting the tone of each of 52 groups of tones, yielding 104 tone selection bits consumed per group of modulation symbols, with these 104 tone selection bits also conveyed per group of modulations symbol via index modulation.

It is noted that, in various embodiments, DRU tones other than those tones selected are unused for transmission in the current PPDU or portion thereof, and thus little or no electromagnetic energy is carried by these unused tones. In other words, when a group of (e.g. QAM) modulation symbols is being transmitted using a selected plurality of tones as described herein, the transmitter also refrains from transmitting on all tones that belong to the N DRUs, other than this selected plurality of tones.

Embodiments of the present disclosure may be applied to the data-carrying portion of an OFDMA frame transmitted for example by an IEEE 802.11bn or other device (e.g. an access point (AP) or station (STA). Embodiments of the present disclosure may additionally or alternatively be applied to other portions of such an OFDMA frame, such as headers, training symbols, redundancy bits, etc. Embodiments may be applied to all portions of a frame, some or all bits to be communicated in the frame, all DRUs, some DRUs, entireties of DRUs, parts of DRUs, or the like.

For example, in FIGS. 1 to 3 above, some or all of the groups 210 may include tones from only a subset of the DRUs, e.g. only two or three of the four illustrated DRUs. The other DRUs may be unused or used for another purpose. For example, if each group 210 includes tones from only two DRUs, then a single tone selection bit from the sequence 320 may be used to select a tone from each group. It is also noted that if a group 210 contains N (4 or possibly greater than 4) tones, then up to $\log_2(N)$ tone selection bits can be used to select a tone from such a group. If a group contains fewer than N tones, the amount of information that is communicated via the tone selection part of index modulation is correspondingly reduced from $\log_2(N)$ bits per block.

A receiver, upon processing a received frame, can determine which tones have been used for modulation, for example by determining which tones carry electromagnetic energy. Based on this information, and with both transmitter and receiver informed of the mapping rule of tone selection bits to tones, the receiver can determine the tone selection bits that were used. Thus, the first sequence of tone selection bits can be recovered and merged with the sequence of bits determined from decoding modulation symbols, to recover the originally transmitted bit sequence (more accurately an estimation thereof, in view of channel noise, etc.) Furthermore, although each group 210 as illustrated is formed from a set of tones 110 which occur contiguously with respect to their index or frequency, in other embodiments, some or all groups 210 can be formed from a set of tones 110 (e.g. one tone from each of N DRUs), such that some or all of the tones are non-contiguous in index or frequency. For example, the first group 210*aa* may alternatively include the tones having index numbers 1, 6, 11 and 16, instead of the tones having index numbers 1, 2, 3 and 4.

It is noted that there may be more or fewer than four DRUs and M may or may not be a multiple of N. In addition, the interleaving may be other than the regular-spaced interleaving as shown. The allocation of tones to DRUs may be constant over time (as shown), or alternatively this allocation may be time-varying. Assignment of tones to DRUs is done in a manner that is known a priori to both transmitter and receiver.

Figure 4:
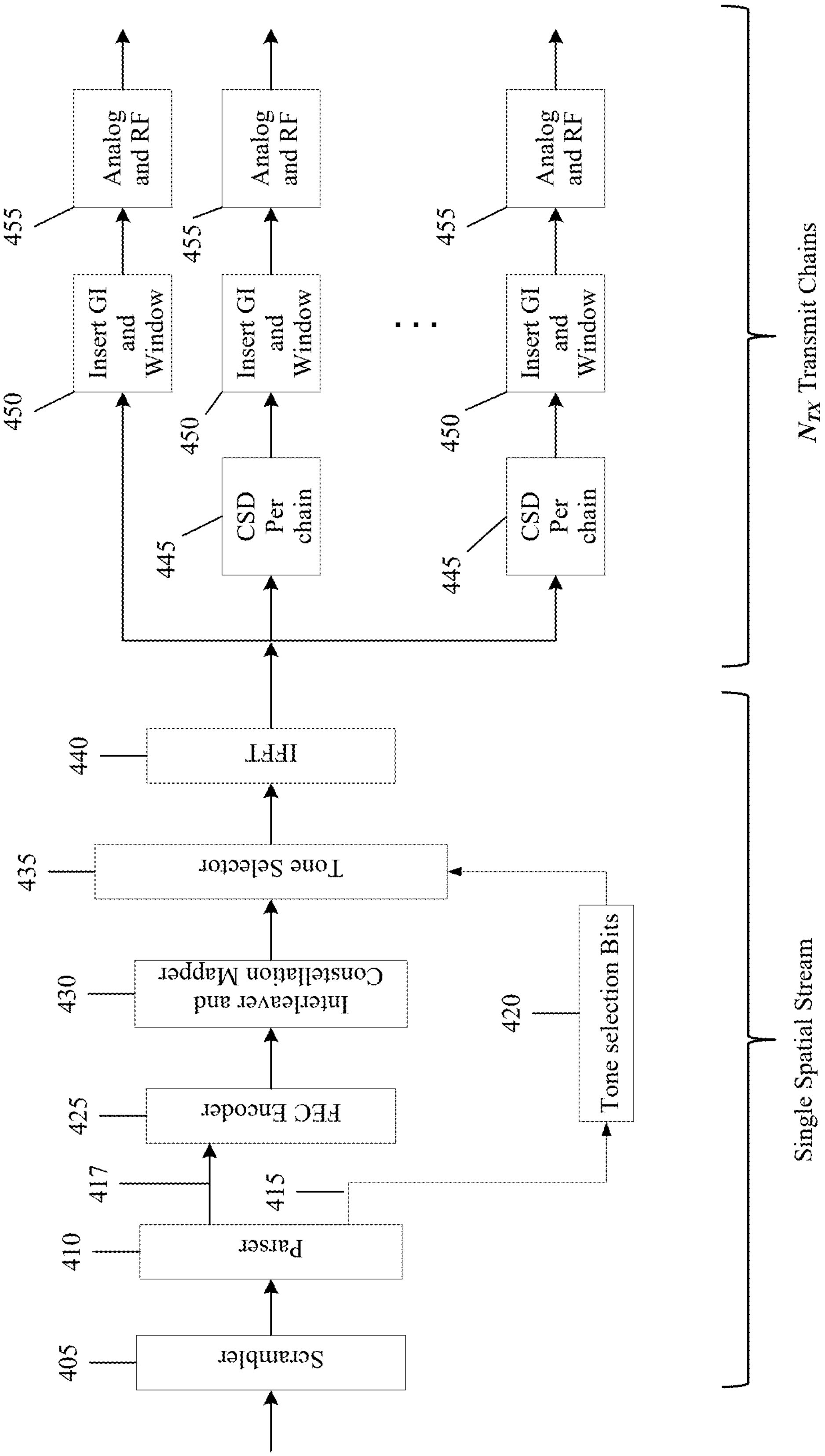
FIG. 4 illustrates a block diagram of a transmitter implementing IM, according to an embodiment of the present disclosure.

FIG. 4 illustrates block diagram functionality of a transmitter, or component thereof, such as a chip or chipset or portion thereof, according to an embodiment of the present disclosure. The transmitter may be or may be associated with an IEEE 802.11 (e.g. IEEE 802.11bn) transmitter such as an AP or STA.

As illustrated, a bit sequence is provided to a scrambler 405. The bit sequence may include application data or other data or information to be transmitted. The bit sequence may include any number of bits and is not necessarily provided as an ongoing sequence. The scrambler converts the bit sequence for example by shuffling bits or inverting certain bits, as will be readily understood by a worker skilled in the art. Scrambling is performed in a predetermined manner which can be undone by a descrambling operation at the receiver. This may be performed without adding any redundancy bits. The output of the scrambler 405 is sent to a parser 410. The parser parses (separates) the bit sequence as output by the scrambler into two constituent bit sequences, namely a first bit sequence 415 and a second bit sequence 417, in a predetermined manner. This parsing can be referred to as demultiplexing or inverse multiplexing. The parser 410 receives a plurality of bits and outputs some of these received bits as bits of the first bit sequence and others of these received bits as bits of the second bit sequence. It is possible that some received bits are output as bits of both the first bit sequence and the second bit sequence, to facilitate a redundancy. The goal of the parser is to provide two sequences of information bits, which are handled differently in order to communicate the overall bit sequence using index modulation. Parsing is performed in a predetermined manner which can be undone by a deparsing operation at the receiver. For example, for every set of b bits received, the first $b_1$ bits can be output as part of the first bit sequence and the remaining bits can be output as part of the second bit sequence.

The first bit sequence 415 is then utilized as a set of tone selection bits 420 of the index modulation. Notably, as illustrated, bits of the first bit sequence are not subjected to any forward error correction (FEC) encoding, which introduces redundant bits as part of a channel encoding process. Thus, the channel selection bits are non-channel-encoded in some embodiments. This configuration is based on the observation that such (e.g. FEC) channel encoding is not necessary to achieve a desired communication performance. However, in other embodiments, the bits of the first bit sequence can be subjected to FEC encoding or other form of channel encoding. For example, the parser can alternatively be located after the FEC encoder 425.

The second bit sequence 417 is provided to the FEC encoder 425. The FEC encoder 425 generates and produces an encoded version of the second bit sequence, for example with redundancy bits added to facilitate error detection, error correction, or both. The FEC encoder 425 can be replaced with any other channel encoder which adds redundancy bits, or which otherwise applies channel encoding to the second bit sequence 417. The FEC encoder 425 can be omitted if such channel encoding is not necessary.

Output of the FEC encoder 425, i.e. a channel-encoded bit sequence, is provided to an interleaver and constellation mapper 430. The interleaver and constellation mapper operates to produce a sequence of (e.g. QAM) modulation symbols based on and representative of the channel-encoded bit sequence. For example, modulation symbols are generated which represent sets of bits of the channel-encoded bit sequence, according to a predetermined rule. A modulation symbol may be a QAM modulation symbol which sets the in-phase and quadrature-phase components of a tone so as to convey information representing a corresponding set of bits. However, at this stage, the symbols have not yet been mapped to specific tones or subcarriers. Therefore, the symbols output by the interleaver and constellation mapper may be defined over a set of logical subcarriers (tones), which are then mapped to actual tones in by the tone selector 435 at the next step. The interleaver may mix the input bit sequence and allocate in a different bit sequence before the output. The size of the output is equal to the size of the input for the interleaver.

The tone selector 435 receives the modulation symbols from the interleaver and constellation mapper, as well as the tone selection bits 420, which are the bits of the first bit sequence 415. The tone selector uses the tone selection bits to select the particular tones which will be used to carry the received modulation symbols. Such tone selection proceeds generally as described with respect to FIG. 3. That is, the tone selector selects a plurality of tones, belonging to a plurality of DRUs, based on the first bit sequence. The tone selector then outputs modulation symbols which are modulated over these selected tones.

In more detail, consider a group of T modulation symbol belonging to the sequence of modulation symbols as output by the interleaver and constellation mapper 430. The group of T modulation symbols (which may collectively represent an OFDM symbol) are defined over T (e.g. 52) logical subcarriers or tones. The logical tones can be denoted by $t_1$, $t_2, \ldots, t_T$. The tone selection bits then assign each of these logical tones to actual tone values of the DRUs. For example, referring FIG. 2, tone $t_1$ is assigned to one of the tones in group 210*aa*, tone $t_2$ is assigned to one of the tones in group 210*ab*, tone $t_{T-1}$ is assigned to one of the tones in group 210*by*, and tone $t_T$ is assigned to one of the tones in group 210*bz*. A particular example of such an assignment is shown in FIG. 3. This process is performed for each group of modulation symbols in the sequence. Thus, the tone selector 435 outputs a sequence of modulation symbols, where each modulation symbol (e.g. QAM symbol) is mapped to a corresponding tone. Viewed another way, the tone selector 435 also outputs a sequence of OFDM symbols, where each OFDM symbol is mapped to a corresponding group of tones. The tones are determined based on the tone selection bits 420. The sequence of modulation symbols may be a viewed sequence of values (e.g. representable as complex numbers) with each value then associated with (mapped to) a corresponding tone, which is used to transmit this value. That is, a modulation symbol, being mapped to a selected tone, is transmitted by modulating such a tone according to the value of the modulation symbol.

In some embodiments, the tone selector 435 can be merged with the constellation mapper. In this case, rather than the constellation mapper defining modulation symbols over logical tones, which are then mapped to selected tones, the tone selection bits 420 can be provided to the constellation mapper, and tones may be selected (in the above-described manner) based on the tone selection bits, for each modulation symbol. Then, the output of the interleaver or other indication of the channel-encoded bit sequence can be used to generate modulation symbols specifically on these selected tones, as indicated by the tone selection bits.

In either case, the tone selector, constellation mapper, or combination thereof, generates a group of modulation symbols. Each modulation symbol is generated based on a portion of the second bit sequence, and the group of modulation symbols are transmitted using the plurality of tones as selected by the tone selector. For each of T groups of N tones, a tone can be selected from this group based on part of the first bit sequence.

The output of the tone selector 435, i.e. a sequence of modulation symbols, is provided to an inverse fast Fourier transform (IFFT) block 440. The IFFT block implements a mapping of the modulation symbols from the frequency domain into the time domain samples.

It is noted that the above-described process, from scrambler 405 to IFFT block 440, can be viewed as representing a single spatial stream. Output of the IFFT block 440 is subsequently used for transmitting of electromagnetic signals.

In the illustrated embodiment, which is provided by way of example, one or a plurality of transmit chains, i.e. $N_{TX}$ transmit chains, are used for transmission. The IFFT output, which is a waveform in the time domain, is separated into $N_{TX}$ parts (copies). All but the first of these parts is subject to a cyclic shift delay (CSD) 445, with the CSDs being different for different transmit chains. Each CSD may time-shift its input waveform by a predetermined amount, set to mitigate the correlation between different transmit chains. Waveforms output by the CSD blocks 445 are then modified to insert guard intervals (GI) and to do windowing via blocks 450. Output of these blocks are provided to an analog and RF blocks 455 which perform digital-to-analog conversion, RF conversion, etc. to prepare the signals for wireless transmission. The signals are then transmitted using one or more antennas. As used herein, radiofrequency (RF) can refer to any suitable wireless frequency, which may potentially include microwave or millimeter wave, as well as traditional RF frequencies. RF frequencies can be in the 2.4 GHz or 5 GHz ranges, for example. Windowing may refer to pulse shaping prior to modulating the signal to an RF signal, as will be readily understood to a person skilled in the art.

Figure 5:
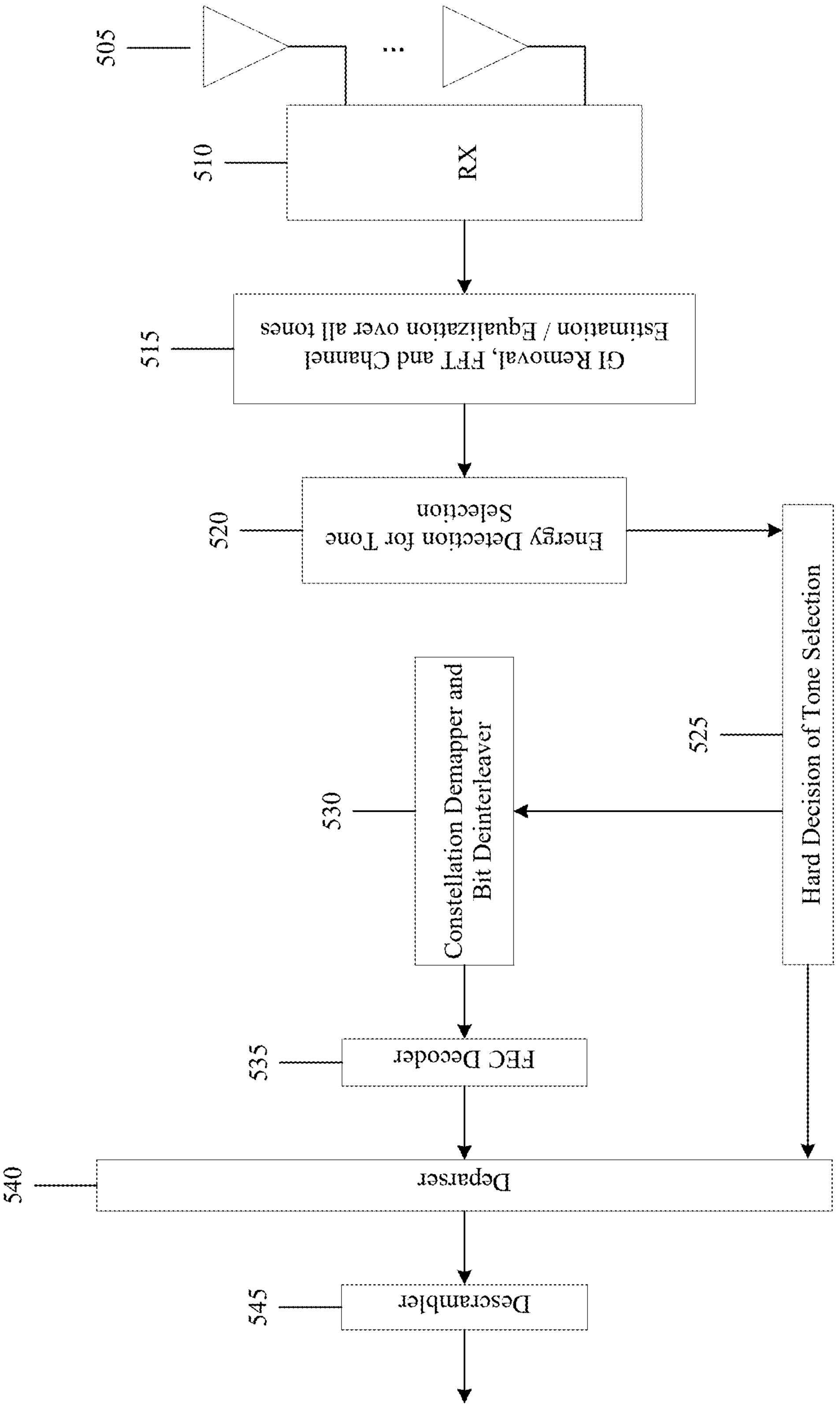
FIG. 5 illustrates a block diagram of a receiver implementing IM and for operation with the transmitter of FIG. 4, according to an embodiment of the present disclosure.

FIG. 5 illustrates block diagram functionality of a receiver, or component thereof, such as a chip or chipset or portion thereof, according to an embodiment of the present disclosure. The transmitter may be or may be associated with an IEEE 802.11 (e.g. IEEE 802.11bn) transmitter such as an AP or STA. The receiver is configured to cooperate with the transmitter of FIG. 4.

The receiver receives wireless signals via antennas 505 and associated receiver electronics 510, which may implement functions such as amplification, frequency conversion/demodulation, analog-to-digital conversion, etc. Output of the receiver electronics 510 is subject to operations 515, such as GI removal (to remove previously inserted guard intervals), fast Fourier transform (FFT) operations to convert signals to a frequency domain representation, and channel estimation and channel equalization procedures. The channel equalization for example is performed to compensate for signal variations due to channel conditions. The channel estimation and equalization are performed over all of the tones of the received signal. Thus, the receiver can receive RF energy indicative of an IEEE 802.11 frame, and subsequently process such RF energy.

Following channel operations 515, energy detection 520 and hard decision of tone selection 525 are performed to determine which tones (subcarriers) of the received signal, after FFT conversion, include non-zero energy. These are tones that, after FFT conversion, indicate an associated complex value indicative of a modulation symbol carried thereby. As previously discussed, only certain tones of the DRUs are selected to carry modulation symbols. The energy detection 520 hard decision of tone selection 525 operations involves determining (estimating) which tones of the DRUs were selected (and used) to carry such modulation symbols, and which tones were not selected. This determination involves determining a set of tones, belonging to DRUs, that carry modulation symbols of the IEEE 802.11 frame.

In some embodiments, energy detection 520 involves detecting energy carried by each tone separately. The tones can be all the tones which are potentially used for carrying modulation symbols, e.g. all illustrated tones in FIG. 1. Detecting energy can include determining the magnitude of complex values associated with each tone following FFT conversion. Detecting energy can in some embodiments include determining which magnitudes are above a predetermined threshold value, indicating that the detected energy is likely due to presence of a modulation symbol rather than noise or interference.

In some embodiments, energy detection 520 involves detecting energy carried by sets of two or more tones. For example, rather than detecting energy carried by each tone individually, energy of pairs of tones can be detected. For example, referring to FIG. 2, for each group 210 of tones, the combined energy can be detected for each of: the first and second tone, the first and third tone, the second and third tone, and the second and fourth tone.

The hard decision of tone selection 525 operation receives the indications of detected energy carried by the tones, from the energy detection 520 operation. Then, a determination is made indicating which tones were used to carry modulation symbols. More specifically, the determination can indicate, for each modulation symbol, which tones were selected and used to carry that modulation symbol. The hard decision utilizes the structure of groups 210 for this purpose. For example, when the transmitter is programmed to select one tone from each group 210*aa*, 210*ab*, . . . 210*by*, 210*bz* as in FIG. 2, the hard decision of tone selection 525 operation can process each of these groups of tones separately to determine which tone from the current group carries the most energy, and indicate that this tone carrying the most energy is (likely) the tone that was selected by the transmitter.

In more detail, as mentioned above, N DRUs each have T tones, for a total number N*T of tones partitioned into T groups of tones. The receiver may, for each group of tones, determine a corresponding tone from the group which carries a highest amount of energy among all of the tones of the group. The first recovered bit sequence will then have a portion that is based on the determined T tones. This portion can include $T*\log_2(N)$ bits, or an equivalent amount of information.

In some embodiments, the hard decision of tone selection 525 operation receives an indication of energy of each tone of a group. The energy of a tone can be the magnitude of the complex value associated with the tone. The operation then generally selects the tone having the most energy. Therefore, determining each corresponding tone carrying the highest amount of energy, out of a set (group) of tones, can include comparing energy levels between all of the tones of the group.

In some embodiments, the hard decision of tone selection 525 operation receives an indication of combined energy of different pairs of tones belonging to a group. The combined energy of a pair of tones can be the sum of the magnitudes of the complex values associated with the tones. Combined energies of pairs of tones are then compared in order to determine the tone carrying the most energy, which is then output as the selected tone. Therefore, determining each corresponding tone carrying the highest amount of energy, out of a set (group) of tones, can include comparing energy levels between pairs of tones of the group.

For example, in the case of a group of four tones, the combined energy of the first two tones in the group may be compared to the combined energy of the last two tones in the group. The pair of tones with the combined highest energy amongst these two combinations is identified and referred to herein as the first result. Additionally, the combined energy of the first and third tones in the group may be compared to the combined energy of the second and fourth tones in the group. The pair of tones with the combined highest energy amongst these two combinations is identified and referred to herein as the second result.

The first result and the second result can be combined to determine the single one of the tones with highest energy. In particular, the tone that is common to the first result and the second result is determined to be the tone with highest energy, which is then output as the selected tone. For example, if the first result corresponds to the first and second tone of the group of four tones, and the second result corresponds to the first and third tone of the group of four tones, then the first tone, being common to both results, is output as the selected tone.

To elaborate on the above process, assume that the transmitter maps tone selection bits '00' to the first tone, tone selection bits '01' to the second tone, tone selection bits '10' to the third tone, and tone selection bits '11' to the fourth tone. Then the first result may indicate the value of the most significant tone selection bit. For example, if the first result indicates the combined energy of the first two tones is higher than the combined energy of the second two tones, then the most significant tone selection bit is likely a '0'. Similarly, the second result may indicate the value of the least significant tone selection bit. For example, if the second result indicates the combined energy of the first and third tones is higher than the combined energy of the second and fourth tones, then the least significant tone selection bit is likely a '0'. In this way, both tone selection bits can be determined via two comparisons.

Output of the hard decision of tone selection 525 operation, which is a sequence of recovered (estimated) tone selection bits, also referred to as a first recovered bit sequence, is provided to a deparser 540. This first recovered bit sequence includes at least a portion that is based on the determined set of tones as output by the hard decision of tone selection operation. The deparser re-combines this first recovered bit sequence with a sequence of bits recovered from modulation symbols, also referred to as a second recovered bit sequence. This second recovered bit sequence has at least a portion that is based on the group of modulation symbols carried by the tones (the same tones that were determined as above). The deparser 540 operates in a complementary manner to the parser 410, that is the first recovered bit sequence and the second recovered bit sequence are combined to generate an overall recovered bit sequence which is formed of recovered bits which occur in the same order as those of the bit sequence as output by the scrambler 405 of the transmitter. The overall recovered bit sequence is indicative of information carried by the IEEE 802.11 frame.

In various embodiments, output of the hard decision of tone selection 525 operation is also provided to the constellation demapper and bit deinterleaver 530. The indication of which tones were determined to have been used for transmission can facilitate the constellation demapping process. The constellation demapping process involves determining the modulation symbols that are received on the subcarriers, and mapping these constellation symbols to information bits by a rule which is the inverse of the rule used by the interleaver and constellation mapper 430 of the transmitter. The bits recovered through the constellation demapper may be determined via what is called the "Log-Likelihood Ratio" which can be obtained with the computation of Euclidean distance between the candidate constellations and the received signal. Bits are also deinterleaved at this point, via a process which is the inverse of the interleaving process of the interleaver of the transmitter.

Output of the constellation demapper and bit deinterleaver 530 is sent to an FEC decoder 535. The FEC decoder operates to decode the bit sequence as provided by the constellation demapper and bit deinterleaver 530, converting this bit sequence from an FEC-encoded (or other channel-encoded) bit sequence into an unencoded bit sequence. The FEC decoder 535 generally performs the inverse operation to the FEC encoder 425. Additionally, the FEC decoder 535 performs error detection, error correction, or both, as part of the decoding process. Output of the FEC decoder is provided to the deparser 540 as already described above.

Output of the deparser 540 is provided to a descrambler 545, which performs a descrambling operation which is generally the inverse of the scrambling operation as applied by the scrambler 405 of the transmitter. The output of the descrambler 545 is a recovered bit sequence which is intended to match, as close as possible, the bit sequence originally provided to the transmitter. This recovered bit sequence can be provided to an application at the receiver, or another destination for the bit sequence.

FIGS. 4 and 5 illustrate an embodiment as it relates to a proposed instance of IEEE 802.11bn transmitter and receiver. However, embodiments of the present disclosure may be applied in other scenarios. Similarly, various functional blocks as illustrated in FIGS. 4 and 5 can be varied, omitted or modified, where appropriate, including the scrambler and descrambler, FEC encoder and decoder, interleaver, FFT and IFFT block, components of the transmit chains, and GI insertion/removal, channel estimation, channel equalization, etc. It is noted that various functional blocks of FIGS. 4 and 5 may also appear in existing IEEE 802.11*b*n transmitters and receivers. Such functional blocks may operate similarly to those as specified in the IEEE 802.11 standards documents, as will be readily understood by a worker skilled in the art.

Embodiments of the present disclosure provide a solution for reliable communication with adequately high data rate, in particular for enhanced long range communication. However, the data rate may be a relatively low data rate in comparison to other IEEE 802.11 communication modes. This may be related to a scheme involving, for example, four 52-tone DRUs in a 20 MHz frame. An index modulation scheme is applied to DRU tone indices on the transmitter side. The tone selection may be detected using an energy detection approach on the receiver side.

As noted above, according to an aspect, a Wi-Fi™ 8 (i.e. $8^{th}$ generation Wi-Fi™ e.g. according to the IEEE 802.11bn standards documents) AP or device (future devices) may be configured according to one or more of methods, features, and embodiments described herein. Embodiments may potentially be applicable to standards subsequent to Wi-Fi™ 8.

Figure 6:
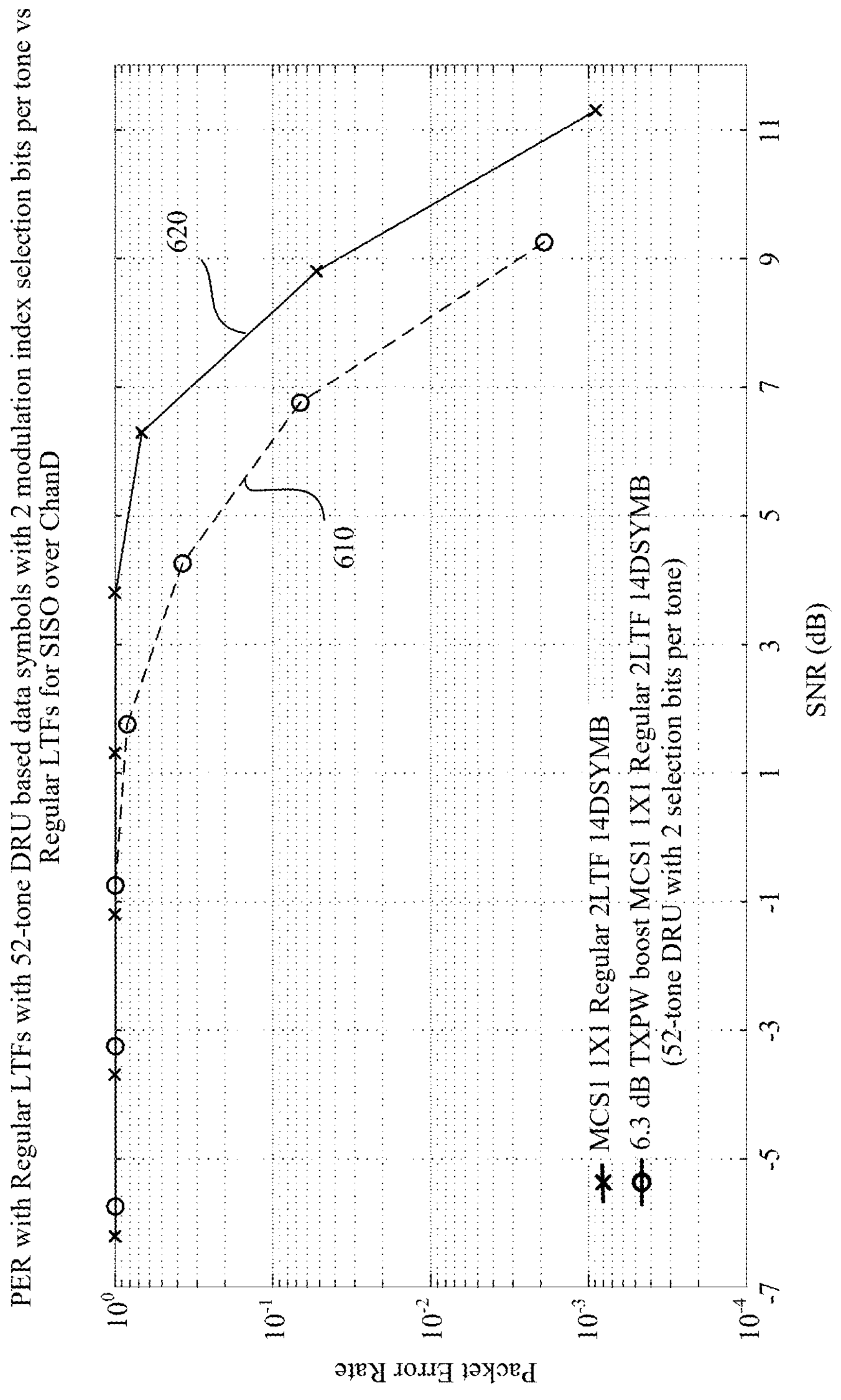
FIG. 6 illustrates simulation results comparing an embodiment of the present disclosure with a conventional transmission scheme.

FIG. 6 illustrates simulation results for an embodiment of the present disclosure. In particular, FIG. 6 illustrates packet error rate (PER) 610 as a function of SNR for a Single User (SU) scheduled for a 52-tone DRU in a 20 MHz frame with two Index Modulation selection bits per tone (e.g. as in FIG. 3). For comparison, PER 620 as a function of SNR is also shown for a Single User in a 242-tone 20 MHz SU-PPDU.

In more detail, the PER 610 was obtained from test involving a Single stream (1TX-1RX) with modulation and coding scheme (MCS) 1 and in 20 MHz BW over Channel D. Two long training fields (LTFs) were used to enhance the channel estimation accuracy. A four times higher transmit (TX) power boost was applied to the 52-tone DRU based 20 MHz frame. A single user is scheduled for a 52-tone DRU in 20 MHz. The PER performance 620 of a single user scheduled for a 52-tone DRU in a 20 MHz frame with two Index Modulation selection bits per tone is compared with a single user schedule in a 242-tone 20 MHz SU-PPDU. The detection method for this simulation is based on the energy detection of a group of 4 tones.

The PER 610 shows about 2 dB gain compared to the regular 802.11 frame with the entire BW scheduled to a single STA.

The Data size for the 52-tone DRU with 2 selection bits per tone above is 252 bytes, and the Data size for the 242-tone SU-PPDU is 410 bytes. If the 242-tone SU-PPDU wants to extend the range, then, the next step to boost the TX Power is the 106-tone OFDMA frame scheduled to a single STA which carries the data size of 178 bytes. Therefore, the Index Modulation provides one more step for the enhanced long range between the Rate and Range to improve the Rate-Versus-Range (RvR) performance. That is, the IM provides more options to achieve a suitable or optimal scheme to compromise between the Rate and the Range.

Figure 7:
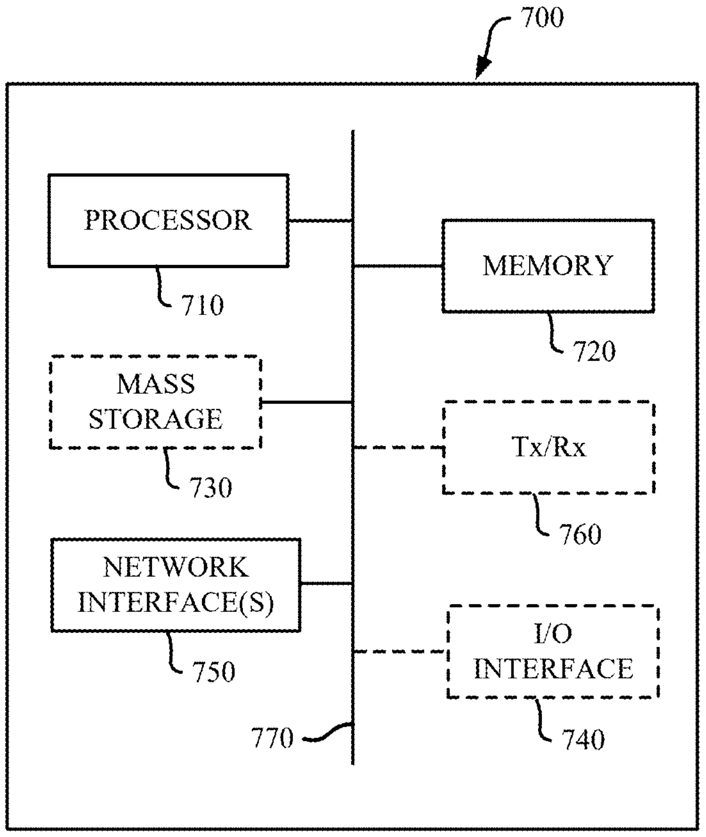
FIG. 7 illustrates an apparatus, such as an IEEE 802.11 device, that may perform any or all of operations of the above methods and features explicitly or implicitly described herein, according to different aspects of the present disclosure.

FIG. 7 illustrates an apparatus 700 that may perform any or all of operations of the above methods and features explicitly or implicitly described herein, according to different aspects of the present disclosure. For example, a computer equipped with network function may be configured as the apparatus 700. In some aspect, apparatus 700 can be a device that connects to the network infrastructure over a radio interface, such as a mobile phone, smart phone or other such device that may be classified as user equipment (UE). In some aspects, the apparatus 700 may be a Machine Type Communications (MTC) device (also referred to as a machine-to-machine (m2m) device), or another such device that may be categorized as a UE despite not providing a direct service to a user. In some embodiments, apparatus 700 is capable of Wi-Fi connectivity, including the transmission and reception of Wi-Fi frames, including IEEE 802.11 frames. In some embodiments, apparatus 700 is equipped to perform channel estimation for optimizing wireless communication. In some embodiments, apparatus 700 is designed to support Wi-Fi 8 technology and future advancements. In some aspects, apparatus 700 may be used to implement one or more aspects described herein. In some embodiments, the apparatus 700 may be a user equipment (UE), an AP, a STA, a transmitter, a receiver, another IEEE 802.11 or Wi-Fi™ device, or the like as appreciated by a person skilled in the art.

As shown, the apparatus 700 may include a processor 710, such as a Central Processing Unit (CPU) or specialized processors such as a Graphics Processing Unit (GPU) or other such processor unit, memory 720, non-transitory mass storage 730, input-output interface 740, network interface 750, and a transceiver 760, all of which are communicatively coupled via bi-directional bus 770. Transceiver 760 may include one or multiple antennas According to certain aspects, any or all of the depicted elements may be utilized, or only a subset of the elements. Further, apparatus 700 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multichip modules, substrates or the like, or a combination thereof may be employed for performing the required logical operations.

The memory 720 may include any type of non-transitory memory such as static random-access memory (SRAM), dynamic random-access memory (DRAM), synchronous DRAM (SDRAM), read-only memory (ROM), any combination of such, or the like. The mass storage element 730 may include any type of non-transitory storage device, such as a solid-state drive, hard disk drive, a magnetic disk drive, an optical disk drive, USB drive, or any computer program product configured to store data and machine executable program code. According to certain aspects, the memory 720 or mass storage 730 may have recorded thereon statements and instructions executable by the processor 710 for performing any method operations described herein.

The processor 710 and memory 720 may function together as a chipset which may be provided together for installation into wireless communication apparatus 700 in order to implement WLAN functionality. The chipset may be configured to receive as input data including but not limited to PPDUs from the network interface 750. The chipset may be configured to output data including but not limited to PPDUs to the network interface 750. Embodiments may be implemented using a chipset (which may or may not contain a processor and memory) or other set of electronic device components. A processor may be a specialized processor. Electronic device components may include digital circuitry, analog circuitry, or a combination thereof, configured to receive bit sequences and operate on the bit sequences as described herein. Different blocks of circuitry may be configured to perform different functions as described herein, and operatively coupled together. Operations may be parallelized, pipelined, etc. The operations can include operations corresponding to antenna selection for spatial modulation, bit sequence parsing, conversion of bits to symbols, and the like. Transmission by antennas and related operations such as power amplification can be included in some embodiments.

In some embodiments, apparatus 700 may include any suitable structure for generating signals, such as control signals, for wireless transmission to one or more network nodes. In some embodiments apparatus 700 further includes one or more antennas which may be based on any suitable structure for transmitting and/or receiving wireless signals. The one or more antennas may be coupled to the transceiver 760.

In some embodiments, processor 710 is configured for performing various processing operations such one or more of: as signal coding, data processing, power control, input/output processing, and any other suitable functionalities to enable the apparatus 700 to access and join the communication system 800 (shown FIG. 8) and operate therein.

In some embodiments, the transceiver 760 may be configured for modulating data or other content for transmission by the at least one antenna to communicate with an AP for example. The transceiver 760 may also be configured for demodulating data or other content received by the at least one antenna. Each transceiver 760 may include any suitable structure for generating signals for wireless transmission and/or processing signals received wirelessly. Each antenna may include any suitable structure for transmitting and/or receiving wireless signals. Although shown as a single functional unit, a transceiver 760 may be implemented separately as at least one transmitter and at least one receiver.

Figure 8:
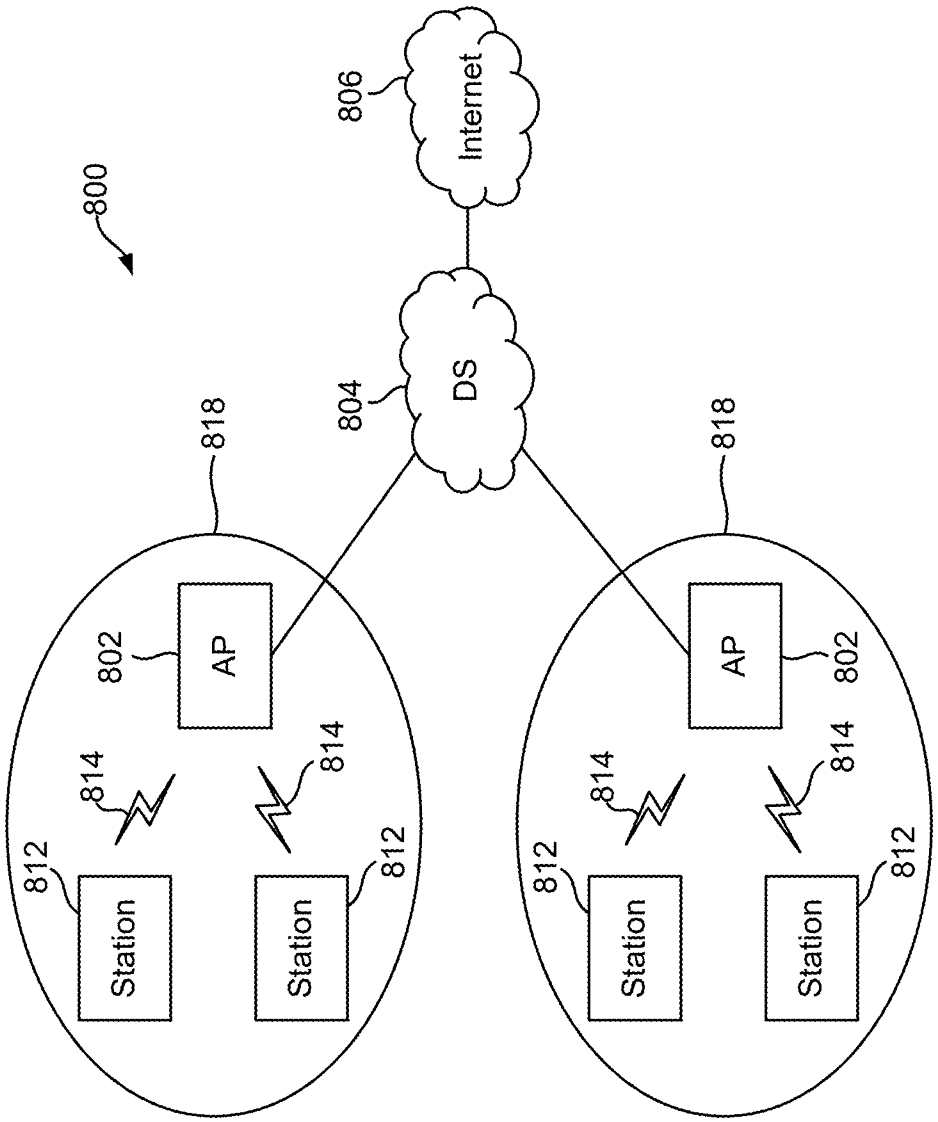
FIG. 8 illustrates a communication system, according to an embodiment of the present disclosure.

FIG. 8 illustrates a communication system 800, according to an embodiment of the present disclosure. The communication system 800 may be a WI-FI system built under relevant standards, such as IEEE 802.11 standard, for example, for a WLAN prioritizing UHR. The communication system 800 includes a plurality of interconnected networking devices 802, such as a plurality of interconnected access points (APs such as WI-FI 8 APs; which may also be referred to as "base stations") forming a distribution system (DS) 804 which is connected to other networks, such as the Internet 806, which may include a network of computers and subnets (intranets) or both, and incorporate protocols, such as Internet Protocol (IP), Transmission Control Protocol (TCP), User Datagram Protocol (UDP), and/or the like.

Each AP 802 is in wireless communication with one or more mobile or stationary stations 812 (STAs) through respective wireless channels 814 for providing wireless network connections thereto. Herein, the APs 802 and STAs 812 may be considered as different types of network nodes (or simply "nodes") of the communication system 800. Together, each AP 802 and the STAs 812 connected thereto form a cell or basic service set (BSS) 818.

In embodiments, the STAs 812 may be any suitable wireless device that may join the communication system 800 via an AP 802 for wireless operation. In various embodiments, a STA 812 may be a wireless electronic device used by a human or user (such as a smartphone, a cellphone, a personal digital assistant (PDA), a laptop, a desktop computer, a tablet, a smart watch, a consumer electronics device, and/or the like). An STA 812 may be a wireless sensor, an Internet-of-things (IoT) device, a robot, a shopping cart, a vehicle, a smart TV, a smart appliance, a wireless transmit/receive unit (WTRU), a mobile station, or the like. Depending on the implementation or application, the STA 812 may be movable autonomously or under the direct and/or remote control of a human, or may be positioned at a fixed position.

In some embodiments, an STA 812 may be a multimode wireless electronic device capable of operation according to multiple radio access technologies and incorporate multiple transceivers necessary to support such.

In embodiments, some or all of the STAs 812 include functionality for communicating with different wireless devices and/or wireless networks via different wireless links using different wireless technologies and/or protocols. Instead of wireless communication (or in addition thereto), some or all of STAs 812 may communicate via wired communication channels to other devices or switches (not shown), and to the Internet 806. For example, a plurality of STAs 812 (such as STAs 812 in proximity with each other) may communicate with each other directly via suitable wired or wireless sidelinks.

In the communication between the AP 802 and the STA 812, a transmission from the STA 812 to the AP 802 may typically be denoted as an uplink (UL), and the wireless channel used therefor is denoted an uplink channel. A transmission from the AP 802 to the STA 812 may typically be denoted as a downlink (DL), and the wireless channel used therefor is denoted a downlink channel. Suitable modulation technologies may be used for communication between the AP 802 and the STA 812. For example, in some embodiments, orthogonal frequency-division multiplexing (OFDM) may be used wherein the channel 814 is partitioned into a plurality orthogonal subchannels for communication between the AP 802 and the STA 812. In embodiments where a plurality of STAs 812 is in communication with a same AP 802, suitable multiple-access technologies may be used. For example, in some embodiments, orthogonal frequency-division multiple access (OFDMA) may be used for communication between the AP 802 and STAs 812.

Some wireless communication systems use OFDMA for multiple access. Generally, OFDMA uses OFDM for multiple users to transmit data at the same time.

For example, a device, such as an AP 802 or an STA 812, transmits data using PPDUs. A PPDU contains a preamble and a data field containing an OFDM symbol. As readily understood by a person skilled in the art, an OFDM symbol combines data elements into a plurality of subcarriers (also referred to as "tones") and uses the so-called "cyclic prefix" for combating inter-symbol interferences.

In embodiments, the wireless communication system 800 or more specifically a one or more AP 802 or one or more STA 812 thereof may use DRUs that may include non-consecutive subcarriers or tones that substantially span the whole BW. Thus, the subcarriers of the DRU may be allocated across the entire OFDMA BW.

In the present disclosure, the terms "a" or "an" are defined to mean "at least one", that is, these terms do not exclude a plural number of items, unless stated otherwise.

In the present disclosure, terms such as "substantially", "generally" and "about", which modify a value, condition or characteristic of a feature of an example embodiment, should be understood to mean that the value, condition or characteristic is defined within tolerances that are acceptable for the proper operation of the example embodiment for its intended application.

In the present disclosure, unless stated otherwise, the terms "connected" and "coupled", and derivatives and variants thereof, refer herein to any structural or functional connection or coupling, either direct or indirect, between two or more elements. For example, the connection or coupling between the elements can be acoustical, mechanical, optical, electrical, thermal, logical, or any combinations thereof.

In the present disclosure, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

In the present disclosure, the terms "system" and "network" may be used interchangeably in embodiments of this application. "At least one" means one or more, and "a plurality of" means two or more. The term "and/or" describes an association relationship of associated objects, and indicates that three relationships may exist. For example, A and/or B may indicate the following three cases: Only A exists, both A and B exist, and only B exists, where A and B may be singular or plural. The character "/" usually indicates an "or" relationship between associated objects. "At least one of the following items (pieces)" or a similar expression thereof indicates any combination of these items, including a single item (piece) or any combination of a plurality of items (pieces). For example, "at least one of A, B, or C" includes A, B, C, A and B, A and C, B and C, or A, B, and C, and "at least one of A, B, and C" may also be understood as including A, B, C, A and B, A and C, B and C, or A, B, and C. In addition, unless otherwise specified, ordinal numbers such as "first" and "second" in embodiments of this application are used to distinguish between a plurality of objects, and are not used to limit a sequence, a time sequence, priorities, or importance of the plurality of objects.

A person skilled in the art should understand that embodiments of this application may be provided as a method, an apparatus (or system), computer-readable storage medium, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Figure 9A:
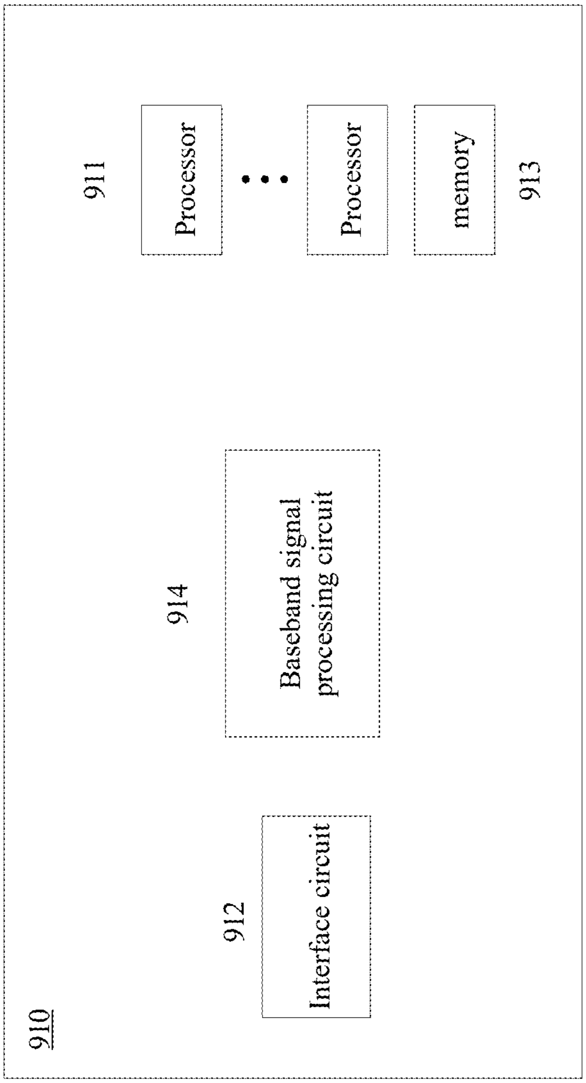
FIG. 9A illustrates an example of an apparatus, according to an embodiment of the present disclosure.

FIG. 9A illustrates an example of an apparatus 910, according to an embodiment of the present disclosure. The apparatus 910 may be a communication device or an apparatus implemented in a communication device in one or more embodiments described herein. For example, the apparatus implemented in a communication device may be an integrated circuit, which in some contexts may be known by other colloquial names, such as chip, modem, modem chip, baseband chip, or baseband processor. In some implementations, one or more integrated circuits can be packaged into a system-on-chip, a system-in-package, or a multi-chip module. The apparatus may comprise one or more integrated circuits or comprise one or more integrated circuits and other discrete components. In some implementations, the apparatus 910 may be similar to or a module in apparatus 700.

In an example, the apparatus 910 may include one or more processors/processor cores 911, and an interface circuit 912. The apparatus 910 may further include a memory 913. The one or more processors/processor cores 911 are configured to process signals and execute one or more communication protocols. The memory 913 is configured to store at least a part of corresponding computer program instructions and/or data. In an example, the one or more processors (or processor cores) 911 execute the computer program instructions stored in the memory 913 to implement related operations (for example, inputting, outputting, receiving, and transmitting) in the foregoing method embodiments. In some implementations, the memory 913 being configured to store the corresponding computer program instructions and/or data may mean that the memory 913 is configured to store all of the corresponding computer program instructions and/or data for execution by the one or more processors/processor cores 911. In some implementations, the memory 913 being configured to store the corresponding computer program instructions and/or data may mean that the memory 913 is configured to store a part of the corresponding computer program instructions and/or data. For example, the part of the corresponding computer program instructions and/or data include computer program instructions and/or data that need to be currently executed by the one or more processors/processor cores 911. Thus, the memory 913 may store different parts of computer program instructions and/or data for a plurality times for the one or more processors (or processor cores) 911 to perform related operations in the foregoing method embodiments. As a communication interface, the interface circuit 912 is configured to implement communication with another component. For example, the interface circuit 912 may communicate a signal with other apparatus/system such as a radio frequency processing apparatus, or processor system. Optionally, to reduce a load of the processor core, a baseband signal processing circuit 914 may be also disposed to implement processing of at least a part of baseband signals, including signal demodulation, modulation, encoding, decoding, or the like.

Apparatus 910 may be processor 710 in apparatus 700, in some scenario, or included in processor 710 in apparatus 700. Apparatus 910 may be or include a baseband chip. In some implementations, the apparatus 910 may be independently packaged into a chip. In some implementations, the apparatus 700 includes different types of chips. The apparatus 910 may be packaged into a processor chip (for example, a SoC chip or an SIP chip) with the different types of chips. In some implementations, the apparatus 910 may be packaged into a chip with some or all of circuits of a radio frequency processing system that may further included in the apparatus 700.

Figure 9B:
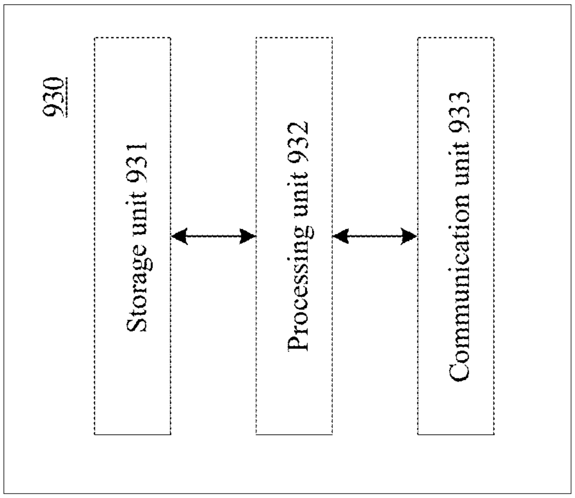
FIG. 9B illustrates another example of an apparatus, according to an embodiment of the present disclosure.

FIG. 9B illustrates an example apparatus 930, according to an embodiment of the present disclosure. Apparatus 930 may include corresponding modules or units configured to implement methods and/or embodiments described herein. In some implementations, the apparatus 930 includes a processing unit 932 and a communication unit 933. Optionally, the apparatus 930 may further include a storage unit 911 configured to store apparatus program code (or instructions) and/or data.

In some embodiments, the apparatus 930 may be a module, or a circuit or a chip responsible for a communication function in apparatus 700. In some implementations, apparatus 930 may be implemented as apparatus 700, accordingly, the processing unit 932 is implemented as processor 710, the communication unit 933 is implemented as transceiver 760, and the storage unit 931 is implemented as memory 720.

In some implementations, a function of the apparatus 930 may be implemented by one or more processors. Specifically, the processor may include a modem chip, or a system on chip SoC chip or an SIP chip that includes a modem core. A function of the communication unit 933 may be implemented by a transceiver circuit.

In some implementations, when the apparatus 930 is a circuit or a chip that is responsible for a communication function, for example, a modem chip, a system on chip SoC chip or an SIP chip that includes a modem core, a function of the processing unit 932 may be implemented by a circuit system that is in the chip and that includes one or more processors or processor cores. A function of the communication unit 933 may be implemented by an interface circuit or a data transceiver circuit on the foregoing chip.

It may be understood that division into the units in the foregoing apparatus is merely logical function division. Each function may correspond to one functional unit, or two or more functions may be integrated into one functional unit. In actual implementation, all or some of the units may be integrated into one physical entity, or may be distributed in different physical entities. In addition, the foregoing functional units may be implemented in a form of hardware, may be implemented in a form of software, or may be implemented in a form of a combination of hardware and software.

Aspects of the present disclosure can be implemented using electronics hardware, software, or a combination thereof. In some aspects, this may be implemented by one or multiple computer processors executing program instructions stored in memory. In some aspects, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising, by a device of an IEEE 802.11 transmitter:

parsing a bit sequence containing bits for transmission into a first sequence and a second sequence;

selecting a plurality of tones belonging to a plurality of IEEE 802.11 distributed resource units (DRUs), the selecting being based on the first sequence; and generating and transmitting an IEEE 802.11 frame comprising a group of modulation symbols each of which is generated based on a portion of the second sequence, the group of modulation symbols being transmitted using the selected plurality of tones, wherein there are N DRUs, and each of the plurality of DRUs comprises a number T of tones, the N DRUs thus having a total number N*T of tones, the total number N*T of tones partitioned into a plurality of T groups of tones, the method further comprising:

for each group of the plurality of groups of tones, selecting a tone from the group based on a respective sub-part of the first sequence.

2. The method of claim 1, wherein each group of the plurality of T groups of tones has N tones including one tone from each of the N DRUs.

3. The method of claim 1, wherein N equals 4, T equals 52, and each of the DRUs is spread across a 20 MHz bandwidth.

4. The method of claim 1, wherein the sub-part includes $\log_2(N)$ bits.

5. The method of claim 1, further comprising, at a time of transmitting the group of modulation symbols using the selected plurality of tones: refraining from transmitting on all tones belonging to the plurality of IEEE 802.11 distributed resource units (DRUs) that are other than the selected plurality of tones.

6. A method comprising, by a device of an IEEE 802.11 transmitter:

parsing a bit sequence containing bits for transmission into a first sequence and a second sequence, the first sequence being non-channel-encoded;

selecting a plurality of tones belonging to a plurality of IEEE 802.11 distributed resource units (DRUs), the selecting being based on the first sequence; and generating and transmitting an IEEE 802.11 frame comprising a group of modulation symbols each of which is generated based on a portion of the second sequence, the group of modulation symbols being transmitted using the selected plurality of tones.

7. The method of claim 6, wherein each member of the group of modulation symbols is a Quadrature-Amplitude Modulation (QAM) symbol mapped to one of the selected plurality of tones.

8. The method of claim 6, wherein there are N DRUs, and each of the plurality of DRUs comprises a number T of tones, the N DRUs thus having a total number N*T of tones, the total number N*T of tones partitioned into a plurality of T groups of tones, the method further comprising:

for each group of the plurality of groups of tones, selecting a tone from the group based on a respective sub-part of the first sequence.

9. The method of claim 8, wherein each group of the plurality of T groups of tones has N tones including one tone from each of the N DRUs.

10. The method of claim 8, wherein N equals 4, T equals 52, and each of the DRUs is spread across a 20 MHz bandwidth.

11. The method of claim 8, wherein the sub-part includes $\log_2(N)$ bits.

12. The method of claim 6, further comprising, at a time of transmitting the group of modulation symbols using the selected plurality of tones: refraining from transmitting on all tones belonging to the plurality of IEEE 802.11 distributed resource units (DRUs) that are other than the selected plurality of tones.

13. An apparatus, in a device of an IEEE 802.11 transmitter, the apparatus configured to:

parse a bit sequence containing bits for transmission into a first sequence and a second sequence, the first sequence being non-channel-encoded;

select a plurality of tones belonging to a plurality of IEEE 802.11 distributed resource units (DRUs), the selecting being based on the first sequence; and generate and transmit an IEEE 802.11 frame comprising a group of modulation symbols each of which is generated based on a portion of the second sequence, the group of modulation symbols being transmitted using the selected plurality of tones.

14. The apparatus of claim 13, wherein each member of the group of modulation symbols is a Quadrature-Amplitude Modulation (QAM) symbol mapped to one of the selected plurality of tones.

15. The apparatus of claim 13, wherein there are N DRUs, and each of the plurality of DRUs comprises a number T of tones, the N DRUs thus having a total number N*T of tones, the total number N*T of tones partitioned into a plurality of T groups of tones, the apparatus further configured to:

for each group of the plurality of groups of tones, select a tone from the group based on a respective sub-part of the first sequence.

16. The apparatus of claim 15, wherein each group of the plurality of T groups of tones has N tones including one tone from each of the N DRUs.

17. The apparatus of claim 15, wherein N equals 4, T equals 52, and each of the DRUs is spread across a 20 MHz bandwidth.

18. The apparatus of claim 15, wherein the sub-part includes $\log_2(N)$ bits.

19. The apparatus of claim 13, wherein the apparatus is further configured to:

at a time of transmitting the group of modulation symbols using the selected plurality of tones: refrain from transmitting on all tones belonging to the plurality of IEEE 802.11 distributed resource units (DRUs) that are other than the selected plurality of tones.

* * * * *